Sept. 24, 1968  A. J. STANKAVICH ET AL  3,403,057

METHOD OF FORMING A FUEL ELECTRODE CONTAINING A RANEY CATALYST

Filed May 12, 1965

INVENTORS.
ANTHONY J. STANKAVICH.
THOMAS E. GECKLE.

ATTORNEY.

United States Patent Office 3,403,057
Patented Sept. 24, 1968

3,403,057
METHOD OF FORMING A FUEL ELECTRODE CONTAINING A RANEY CATALYST
Anthony J. Stankavich, Syracuse, and Thomas E. Geckle, Liverpool, N.Y., assignors to Carrier Corporation, Syracuse, N.Y., a corporation of Delaware
Filed May 12, 1965, Ser. No. 455,081
5 Claims. (Cl. 136—120)

This invention relates to fuel electrodes for fuel cells and to a method of forming the same and, more particularly, to fuel cell electrodes capable of catalyzing the oxidation of partially oxidized liquid hydrocarbons, such as methanol and ethylene glycol, and certain high energy fuels, such as hydrazine and borohydrids, at relatively low temperatures.

The chief object of the present invention is to provide a method of making an improved fuel electrode for fuel cells.

An object of the invention is to provide an improved fuel electrode for fuel cells.

A further object is to provide a method of making an improved fuel electrode for fuel cells in which the electrode has a compacted, dense peripheral portion adapted to retard fluids escaping through the outer edges of the electrode. Other objects of the invention will be readily perceived from the following description.

This invention relates to a method of forming a fuel electrode for a fuel cell, in which the steps consist in spraying a powdered Raney alloy upon a metal base to form at least a mechanical bond with the base, said alloy containing an active component and an inactive component, and leaching the inactive component from the alloy to provide a catalytically active surface upon the base.

This invention further relates to a catalytically active fuel electrode for a fuel comprising a metal base having a Raney catalyst surface, said base having a porous re-enforcing member embedded therein, said member being formed of a material adapted to provide desired electrical contact with a current collector, the base having an area greater than the area of the re-enforcing member, the peripheral portion of the base being more dense than the portion of the base underlying the re-enforcing member.

The attached drawing illustrates a preferred embodiment of the invention, in which FIGURE 1 is a view in elevation of the fuel electrode of the present invention;

Figure 1:
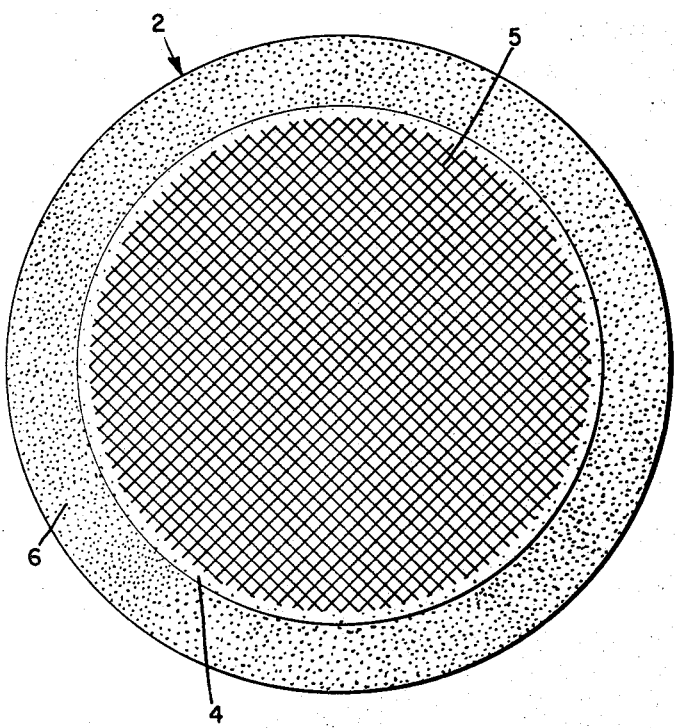

Referring to the attached drawing, there is shown in FIGURE 1 the improved fuel electrode 2 of the present invention. Electrode 2 includes a base 3 which may comprise a sheet of sintered porous metal, such as is used for a battery plaque, in the form of a disk. A catalytically active surface coating 4 is provided on the base 3. Surface 4 comprises a Raney nickel-aluminum alloy from which the aluminum was removed. Surface 4 may be defined as being formed of any material having a catalytically active surface formed by the removal of at least one inactive component from an alloy of two or more components.

A nickel wire cloth 5 is embedded approximately centrally of the base 2 as a re-enforcing member. The nickel wire cloth also serves to provide desired electrical contact with a current collector. As shown, base 2 has an area greater than the area of the re-enforcing member 5. Member 5 may be comprised of 20 mesh 0.014″ diameter wire although other meshes and wire diameters may be employed if desired.

The peripheral edge of the coated disk 3 is compacted as shown at 6 to provide an edge more dense than the body of the disk thus assuring that fluids pass more readily through the body of the disk and retarding or preventing escape of fluids through the circumferential edge of the disk when the electrode is in use in a fuel cell. It will be observed that a small circumferential portion of the coated base surrounding the screen 5 is not compacted. Preferably, such portion is not compacted to assure that the screen is not injured during the process of rendering the edge of the disk more dense.

In preparing the fuel electrode, a sintered nickel battery plaque approximately 6¼″ in diameter is flame sprayed with a Raney nickel-aluminum alloy powder. The alloy consists of nickel and aluminum having approximately 50% of each element by weight, having a screen size of approximately 200–300 mesh. The alloy is deposited on the plaque in a thickness of approximately two mils. During the flame spraying operation, the powder in effect melts in the gas stream and is deposited on the base in a size roughly similar to the size of the powder supplied to the spraying gun. The coating so formed appears to form a mechanical bond with the base. While it is preferred to employ a flame spraying technique, it will be appreciated similar procedures may be employed, it only being necessary that the alloy be deposited on the base while hot without appreciable oxidation. Oxidation may be minimized by addition of 3–5% titanium hydride with the alloy powder.

Thereafter, a disk of nickel wire cloth as described above having a diameter of approximately 4½″ is pressed into the center of the sprayed disk, employing a pressure of approximately two tons per square inch for approximately three minutes. This procedure embeds the screen to some extent in the coated surface thus assuring that the screen is in adequate contact with the base to serve as a re-enforcing member therefor.

The area between the circumference of the disk and a concentric circle approximately 4⅞″ in diameter is then compacted, using a pressure of approximately 5 tons per square inch for approximately three minutes. The compact, dense body so formed retards escape of fluids through the edge of the electrode when it is in use.

The Raney metal alloy coating of the disk is then leached as follows: The re-enforced, coated disk is immersed in an aqueous solution containing 30% potassium hydroxide for a period of perhaps sixteen hours. Thereafter, remaining traces of aluminum are removed by electrolysis. The disk is connected as the positive electrode in a cell containing an aqueous electrolyte of 30% potassium hydroxide and a platinum cathode, applying approximately one volt to the cell for at least twenty minutes. The electrode is then washed in distilled water and stored under water or dilute potassium hydroxide until used.

Figures 2, 3:
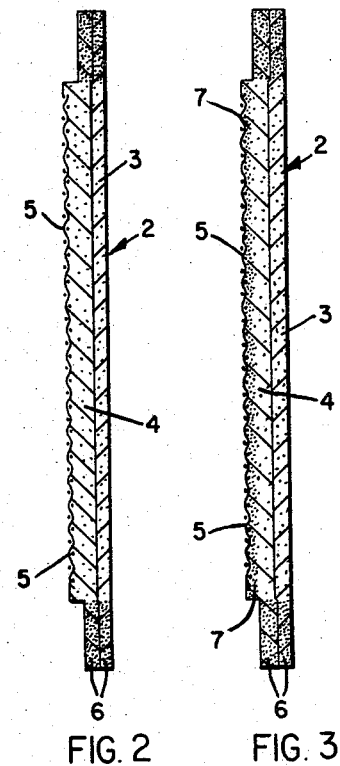
FIGURE 2 is a view in section of the electrode of FIGURE 1.
FIGURE 3 is a view in section of a modified fuel electrode.

As shown in FIGURE 3, in some cases it may be desirable to apply a relatively thin coating 7 of a metal selected from Group VIII of the periodic table, preferably, platinum, palladium and iridium, on the coated base. While for purposes of illustration, it is termed a coating, it will be understood the outer surface of the coated base does not appear to be changed since the metal is absorbed. Such procedure in some cases provides highly desirable electrodes from the standpoint of cost because only a small quantity of the precious metal need be employed to provide a highly active electrode surface. If it is desired to apply such a coating, the electrode previously formed may be connected as the cathode in a cell containing a soluble platinum compound such as chloroplatinic acid and a platinum anode. A suitable platinum coating is thus formed on the active nickel surface. As used herein, the term "Raney alloy" may be defined as an alloy of any two or more metals which have the property of forming a catalytically active surface upon the leaching of an inactive component metal from the alloy to leave an active metal component.

The present invention provides an inexpensive method of forming a highly desirable fuel electrode for fuel cells. The electrode so formed catalyzes substantially the same processes as are catalyzed by more costly metals such as platinum. The electrode so formed is highly effective in use and retards escape of fluids through its edges thus increasing the effectiveness and efficiency of the fuel cell in which it may be employed.

While a preferred embodiment of the invention has been described, it will be understood that the invention is not limited thereto since it may be otherwise embodied within the scope of the following claims.

We claim:

1. In the method of forming a fuel electrode for a fuel cell, the steps which consist in spraying a powdered Raney alloy upon a metal base to form at least a mechanical bond with the base, said alloy containing an active component and an inactive component, compacting at least a portion of the peripheral portion of the coated base, and leaching the inactive component from the alloy to provide a catalytically active surface upon the base.

2. In the method of forming a fuel electrode for a fuel cell, the steps which consist in flame spraying a powdered Raney alloy upon a sintered nickel base to form at least a mechanical bond with the base, said alloy containing nickel and aluminum in approximately fifty percent of each element by weight, compacting at least a portion of the peripheral portion of the coated base, and leaching the aluminum from the alloy to provide a catalytically active surface upon the base.

3. In the method of forming a fuel electrode for a fuel cell, the steps which consist in spraying an unsintered, powdered Raney alloy upon a metal base to form at least a mechanical bond with the base, said alloy containing an active component and an inactive component, embedding a porous re-enforcing member in the coated base, said member being adapted to provide a desired electrical contact with a current collector, said base having an area greater than the area of the re-enforcing member, compacting at least a portion of the area of the coated base not covered by the re-enforcing member, and leaching the inactive component from the alloy to provide a catalytically active surface upon the base.

4. In the method of forming a fuel electrode for a fuel cell, the steps which consist in flame spraying a powdered Raney alloy upon a sintered nickel base to form at least a mechanical bond with the base, said alloy containing nickel and aluminum in approximately fifty percent of each element by weight, embedding a nickel wire screen in the base as a re-enforcing member, said screen being adapted to provide a desired electrical contact with a current collector, said base having an area greater than the area of the screen, compacting the peripheral portion of the base not covered by the screen, exposing the coated base to an aqueous solution containing approximately 30 percent by weight of potassium hydroxide to leach aluminum from the alloy, and removing remaining traces of aluminum by electrolysis.

5. In the method of forming a fuel electrode for a fuel cell, the steps which consist in flame spraying a powdered Raney alloy upon a sintered nickel base to form at least a mechanical bond with the base, said alloy containing nickel and aluminum in approximately fifty percent of each element by weight, embedding a nickel wire screen in the base as a re-enforcing member, said screen being adapted to provide a desired electrical contact with a current collector, said base having an area greater than the area of the screen, compacting the peripheral portion of the base not covered by the screen, exposing the coated base to an aqueous solution containing approximately thirty percent by weight of potassium hydroxide to leach aluminum from the alloy, removing remaining traces of aluminum by electrolysis, and electrolytically coating the remaining alloy surface with a relatively thin coating of a different metal selected from the group consisting of Group VIII of the Periodic Table.

References Cited

UNITED STATES PATENTS

| | | | |
|---|---|---|---|
| 2,716,670 | 8/1955 | Bacon | 136—120 |
| 3,170,820 | 2/1965 | Drengler et al. | 136—120 X |
| 3,235,513 | 2/1966 | Jung et al. | 136—120 X |

FOREIGN PATENTS

| | | |
|---|---|---|
| 239,130 | 5/1959 | Australia. |
| 698,092 | 11/1964 | Canada. |

WINSTON A. DOUGLAS, *Primary Examiner.*

O. F. CRUTCHFIELD, *Assistant Examiner.*